US012669516B2

(12) United States Patent
Shawish et al.

(10) Patent No.: US 12,669,516 B2
(45) Date of Patent: Jun. 30, 2026

(54) METHODS, MEDIUMS, AND SYSTEMS FOR ANALYTICAL METHOD DEBUGGING

(71) Applicant: Waters Technologies Ireland Limited, Dublin (IE)

(72) Inventors: Fadi Shawish, Pawtucket, RI (US); Richard S. Threlfall, Westborough, MA (US); Stephen Payne, Franklin, MA (US)

(73) Assignee: Waters Technologies Ireland Limited, Dublin (IE)

( * ) Notice: Subject to any disclaimer, the term of this patent is extended or adjusted under 35 U.S.C. 154(b) by 657 days.

(21) Appl. No.: 18/149,876

(22) Filed: Jan. 4, 2023

(65) Prior Publication Data

US 2023/0213539 A1 Jul. 6, 2023

Related U.S. Application Data

(60) Provisional application No. 63/296,652, filed on Jan. 5, 2022.

(51) Int. Cl.
G01N 35/00 (2006.01)
G01N 30/02 (2006.01)
(Continued)

(52) U.S. Cl.
CPC ....... G01N 35/00594 (2013.01); G01N 30/16 (2013.01); G01N 30/32 (2013.01);
(Continued)

(58) Field of Classification Search
CPC ....... G01N 35/00594; G01N 35/00584; G01N 2035/00891; G01N 2035/0091;
(Continued)

(56) References Cited

U.S. PATENT DOCUMENTS

2007/0143042 A1* 6/2007 Stewart .............. G01N 30/8662
702/50
2018/0080949 A1 3/2018 Jost et al.
(Continued)

FOREIGN PATENT DOCUMENTS

EP 1188126 B1 4/2005

OTHER PUBLICATIONS

International Search Report and Written Opinion for International Patent Application No. PCT/IB2023/050066, mailed Mar. 29, 2023.
(Continued)

*Primary Examiner* — Manuel L Barbee
(74) *Attorney, Agent, or Firm* — Goodwin Procter LLP

(57) ABSTRACT

Exemplary embodiments provide computer-implemented methods, mediums, and apparatuses configured to provide an interactive analytical method debugger for an analytical laboratory system. The analytical laboratory system may include a laboratory analytical device with a number of settings, parameters, etc. The laboratory analytical device may process a sample according to an analytical method that (among other things) defines a configuration for the device. The settings for the method may be organized into categories. The interactive debugger identifies problems with the method (e.g., incompatibilities, values out of range, etc.) and automatically allow the user to view the category of the method that is relevant to addressing the issue. Possible solutions may be proposed in the debugger interface, allowing the user to quickly identify and address the problem. Embodiments are particularly well-suited to situations where a method is ported from an old device to a new device.

17 Claims, 7 Drawing Sheets

(51) Int. Cl.
| | |
|---|---|
| *G01N 30/16* | (2006.01) |
| *G01N 30/32* | (2006.01) |
| *G01N 30/72* | (2006.01) |

(52) U.S. Cl.
CPC ....... *G01N 30/72* (2013.01); *G01N 2030/027* (2013.01); *G01N 2030/326* (2013.01); *G01N 2035/00891* (2013.01)

(58) Field of Classification Search
CPC ........ G01N 30/16; G01N 30/32; G01N 30/72; G01N 2030/027; G01N 2030/326; G06F 11/00775; G06F 11/366; G06F 11/327; G06F 11/3013; G06F 11/3051; G06F 11/0736; G06F 11/079; G06F 11/0793; G06Q 10/06
See application file for complete search history.

(56) References Cited

U.S. PATENT DOCUMENTS

| | | | |
|---|---|---|---|
| 2020/0185091 A1* | 6/2020 | Davis ..................... | G16H 10/40 |
| 2020/0278365 A1* | 9/2020 | Nehashi .......... | G01N 35/00623 |
| 2021/0240312 A1* | 8/2021 | Wohlstadter .......... | G06F 3/0482 |

OTHER PUBLICATIONS

International Preliminary Report on Patentability for International Patent Application No. PCT/IB2023/050066, mailed Jul. 18, 2024.

* cited by examiner

202a — Check Acquisition

202b — Check Input

204a

202c — Integrate Peaks

204b

202d — Identify Components

204c

202e — Calibration

202f — System Suitability

202g — Review Results

206a

206b

206c

206d

206e

206f

206g

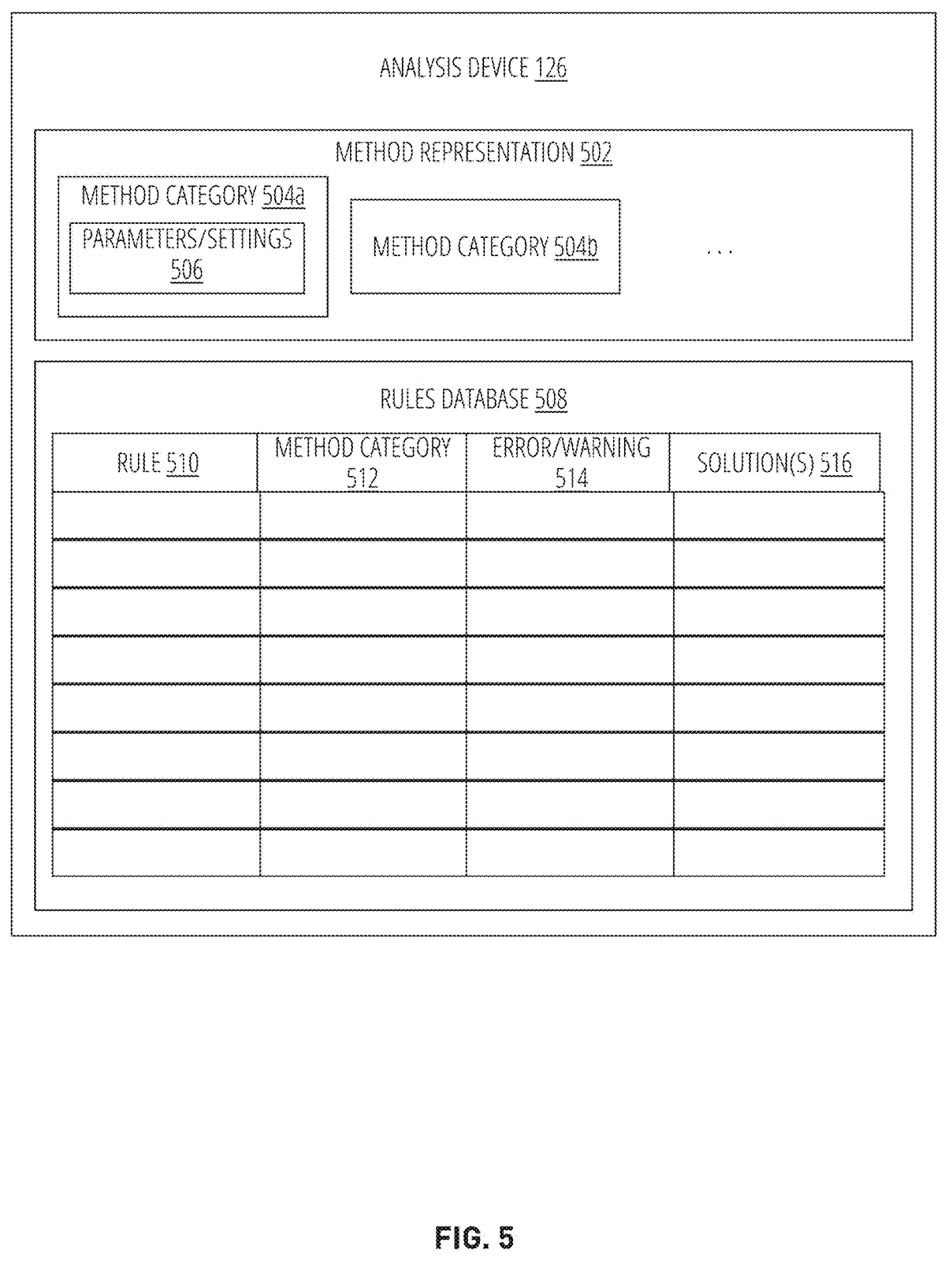

ANALYSIS DEVICE 126

METHOD REPRESENTATION 502

METHOD CATEGORY 504a

PARAMETERS/SETTINGS 506

METHOD CATEGORY 504b

. . .

RULES DATABASE 508

| RULE 510 | METHOD CATEGORY 512 | ERROR/WARNING 514 | SOLUTION(S) 516 |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |

FIG. 5

METHODS, MEDIUMS, AND SYSTEMS FOR ANALYTICAL METHOD DEBUGGING

CROSS-REFERENCE TO RELATED APPLICATIONS

This application claims the benefit of and priority to U.S. Provisional Patent Application No. 63/296,652, filed Jan. 5, 2022. The entire disclosure of which is hereby incorporated by reference.

BACKGROUND

Laboratory analytical instruments are devices for qualitatively and/or quantitatively analyzing samples. They are often used in a laboratory setting for scientific research or testing. Such devices may measure the chemical makeup of a sample, the quantity of components in a sample, and perform similar analyses. Examples include mass spectrometers, chromatographs, titrators, spectrometers, elemental analyzers, particle size analyzers, rheometers, thermal analyzers, etc.

When data is collected from a laboratory analytical instrument, it is often analyzed according to an analytical method. Analytical methods are analysis techniques developed by scientists that represent best practices or effective ways to analyze a sample using an instrument. The analytical method may define the steps used to analyze the data, parameters or settings to be used in the analysis steps, a permitted order of the steps, etc.

BRIEF SUMMARY

Exemplary embodiments relate to improved techniques for debugging analytical methods in an analytical chemistry or laboratory system. Exemplary embodiments may include computer-implemented methods, as well as non-transitory computer-readable mediums storing instructions for performing the methods, apparatuses configured to perform the methods, etc.

Some analytical chemistry/laboratory systems allow users to define and edit their own methods. A method is typically defined with respect to a particular laboratory analytical instrument or analytical chemistry system but can sometimes be imported to different systems. Differences between the systems can lead to incompatibilities that can cause problems in the imported method when it is run on different devices. Moreover, some methods have codependent parameters. When a user edits a first parameter, it can cause problems in related parameters—for example, changing a pressure limit might mean that a desired gradient cannot be achieved.

Conventionally, it takes a great deal of time and effort to diagnose problems in a method. Even when the problems are properly identified, the solution to those problems may not be readily apparent. Furthermore, when a problem is solved, sometimes the changes that were required to solve the problem give rise to new problems (making it even more difficult to identify a workable configuration).

Exemplary embodiments provide an analytical method debugger for an analytical chemistry/laboratory system. The debugger identifies problems in the method and links the problems to a particular method category where the problem arises. A user can therefore navigate directly from the problem to the location where it can be addressed. Moreover, the debugger may suggest remedies so that the debugger can guide the user to a solution to the problem.

In one embodiment, a representation of an analytical method for performing an analysis in an analytical laboratory system may be accessed. The analytical laboratory system may include a laboratory analytical instrument. The analytical method may include a plurality of parameters for the laboratory analytical instrument, where the parameters are divided into categories. The parameters may be, for example, operating settings or configurations for the laboratory analytical instrument. The categories may relate different parameters based on the effects achieved by the settings (e.g., adjusting the gradient, configuring the data channels, identifying the solvents used by the laboratory analytical instrument, etc.).

A list of the categories may be displayed in an interface. The interface may also display an issue associated with the analytical method, where the issue is associated with a particular category of the method. A selection of the issue may be received, and the interface may automatically navigate, in the list of the categories, to the particular category associated with the selected issue. The category and issue may be paired together through a set of rules (e.g., stored in a rules database).

In contrast to conventional techniques, the debugger of the first embodiment is interactive and is able to send a user directly to the step in the method where the issue can be addressed. In addition to quickly identifying problems with the method, the first embodiment allows the user to quickly navigate to the specific settings that gave rise to the problem so that the problem can be addressed.

According to a second embodiment, the analytical laboratory system may be a current analytical laboratory system. The analytical method may be imported from a previous analytical laboratory system. The issue may be identified based on an incompatibility between the previous analytical laboratory system and the current analytical laboratory system.

The second embodiment is useful when upgrading or otherwise switching from one instrument to another. Generally, a user may wish to continue using a method with which they are familiar; however, incompatibilities between the old and new instruments may mean that the method will not function as intended. The second embodiment allows these inconsistencies (of which there may be many) to be quickly identified and addressed.

According to a third embodiment, the above-described technique may be performed by the analytical laboratory system. The analytical laboratory system may access a list of system capabilities and may use the list of system capabilities to identify the issue.

The third embodiment allows for a live method debugger, where the debugger resides on the system that is running it. Because the system has knowledge of its own capabilities, the debugger can more readily identify incompatibilities and other problems that might arise when using the system.

According to a fourth embodiment, an update to a parameter in the particular category may be received. The update may address the issue, and the interface may be updated to indicate that the issue is resolved.

Accordingly, the user is provided with immediate feedback that their adjustment (e.g., changing a setting) has addressed the problem, and the user need not continue to hunt down the problem. In contrast, in a conventional method editing technique the user might need to run the method to determine whether a problem has been resolved. Especially if the user is attempting to solve multiple problems at once, they might not know if and when a change to a setting has fixed a problem. They might make more changes than necessary in an attempt to address the issue, wasting time and resources (and potentially creating a subpar method).

According to a fifth embodiment, the issue may be identified by receiving a change to a first parameter from the plurality of parameters, identifying that a second parameter is codependent on the first parameter, and determining that the change to the first parameter caused the issue with the second parameter.

In traditional manual method debugging, codependencies can be particularly difficult to identify. Changing a value for a first parameter may cause a second (or more) parameter(s) to change in a manner that is difficult to identify or understand. Using the fifth embodiment, complex codependencies can be identified in the rule set and the interface can send the user to a problematic codependent parameter when an issue is identified.

According to a sixth embodiment, the issue may be identified by consulting a list of rules associated with the analytical laboratory system, and determining that a setting for at least one of the plurality of parameters violates a rule from the list. Because the issues are maintained in a rule set, the rules (and hence the debugger) can be easily updated as new systems with new configurations are brought online. This allows existing methods to be ported to new systems efficiently and quickly. It also allows the debugger to be user-extensible when a user adds a rule to the rules list.

According to a seventh embodiment, the rules may include a first rule and a second rule that is interdependent on the first rule. For example, whether the second rule is violated may depend on whether or not the first rule is violated. The setting for the at least one of the plurality of parameters may violate the second rule. When rules are interrelated as in the seventh embodiment, greater degrees of complexity can be captured by the rule set. For instance, some conditions or settings may be problematic when presented together, but not if they occur separately.

Unless otherwise noted, it is contemplated that each embodiment may be used separately to achieve the advantages specifically identified above. It is also contemplated that the embodiments described above (and elsewhere herein) may be used in any combination to achieve further synergistic effects. Other technical features will be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 depicts an example of a data structure for the method debugger in accordance with one embodiment.

DETAILED DESCRIPTION

Figure 1:
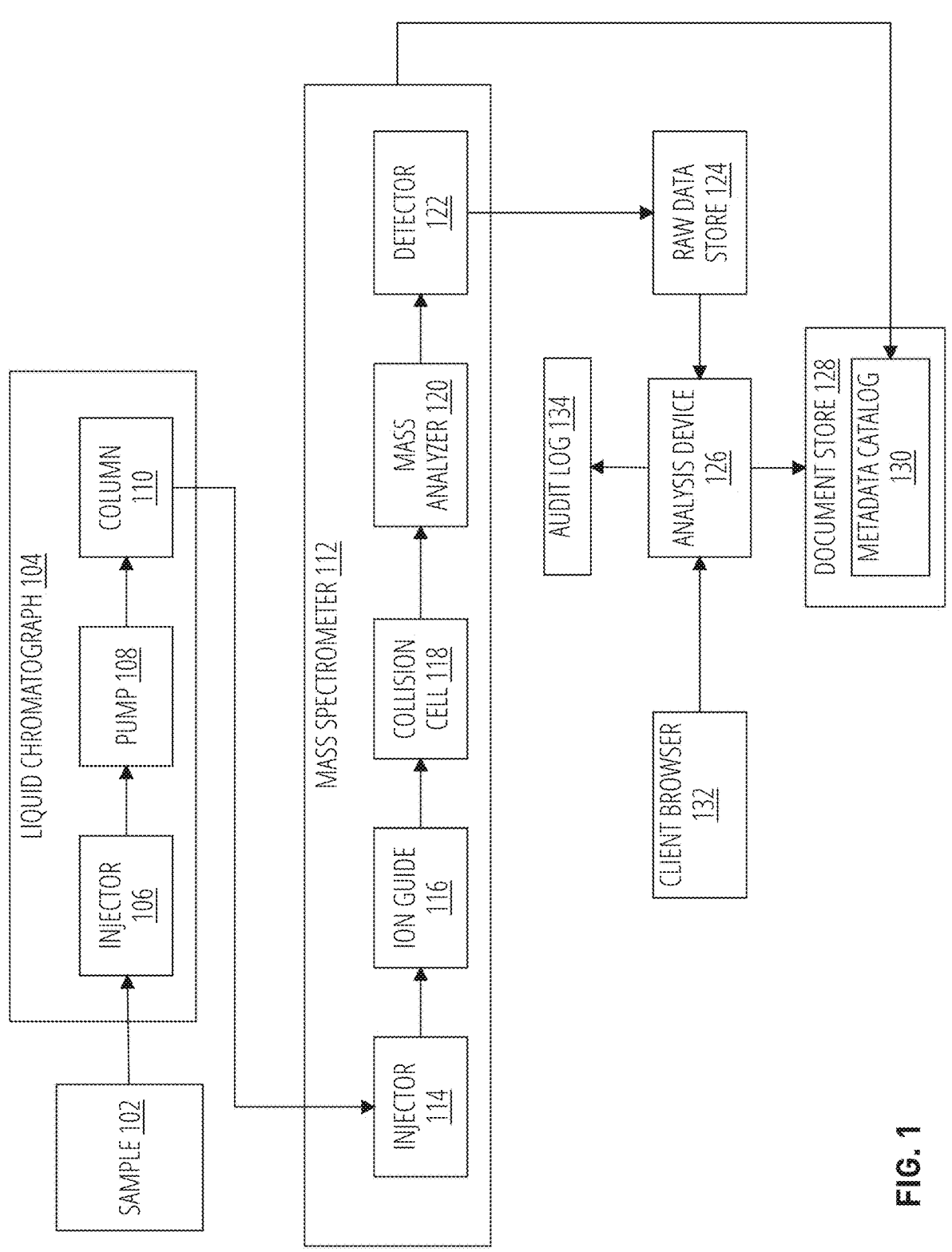
FIG. 1 illustrates an example of a mass spectrometry system according to an exemplary embodiment.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

These and other features will be described in more detail below with reference to the accompanying figures.

For purposes of illustration, FIG. 1 is a schematic diagram of an analytic laboratory system that may be used in connection with techniques herein. Although FIG. 1 depicts particular types of devices in a specific liquid chromatography/mass spectrometry (LCMS) configuration, one of ordinary skill in the art will understand that different types of chromatographic devices (e.g., MS, tandem MS, etc.) may also be used in connection with the present disclosure.

A sample 102 is injected into a liquid chromatograph 104 through an injector 106. A pump 108 pumps the sample through a column 110 to separate the mixture into component parts according to retention time through the column.

The output from the column is input to a mass spectrometer 112 for analysis. Initially, the sample is desolved and ionized by a desolvation/ionization device 114. Desolvation can be any technique for desolvation, including, for example, a heater, a gas, a heater in combination with a gas or other desolvation technique. Ionization can be by any ionization techniques, including for example, electrospray ionization (ESI), atmospheric pressure chemical ionization (APCI), matrix assisted laser desorption (MALDI) or other ionization technique. Ions resulting from the ionization are fed to a collision cell 118 by a voltage gradient being applied to an ion guide 116. Collision cell 118 can be used to pass the ions (low-energy) or to fragment the ions (high-energy).

Different techniques may be used in which an alternating voltage can be applied across the collision cell 118 to cause fragmentation. Spectra are collected for the precursors at low-energy (no collisions) and fragments at high-energy (results of collisions).

The output of collision cell 118 is input to a mass analyzer 120. Mass analyzer 120 can be any mass analyzer, including quadrupole, time-of-flight (TOF), ion trap, magnetic sector mass analyzers as well as combinations thereof. A detector 122 detects ions emanating from mass analyzer 122. Detector 122 can be integral with mass analyzer 120. For example, in the case of a TOF mass analyzer, detector 122 can be a microchannel plate detector that counts intensity of ions, i.e., counts numbers of ions impinging it.

A raw data store 124 may provide permanent storage for storing the ion counts for analysis. For example, raw data store 124 can be an internal or external computer data storage device such as a disk, flash-based storage, and the like. An analysis device 126 analyzes the stored data. Data can also be analyzed in real time without requiring storage in a storage medium 124. In real time analysis, detector 122 passes data to be analyzed directly to analysis device 126 without first storing it to permanent storage.

Collision cell 118 performs fragmentation of the precursor ions. Fragmentation can be used to determine the primary sequence of a peptide and subsequently lead to the identity of the originating protein. Collision cell 118 includes a gas such as helium, argon, nitrogen, air, or methane. When a charged precursor interacts with gas atoms, the resulting collisions can fragment the precursor by breaking it up into resulting fragment ions. Such fragmentation can be accomplished by switching the voltage in a collision cell between a low voltage state (e.g., low energy, <5 V) and a high voltage state (e.g., high or elevated energy, >15V). High and low voltage may be referred to as high and low energy, since a high or low voltage respectively is used to impart kinetic energy to an ion.

Various protocols can be used to determine when and how to switch the voltage for such an MS/MS acquisition. After data acquisition, the resulting spectra can be extracted from the raw data store 124 and displayed and processed by post-acquisition algorithms in the analysis device 126.

Metadata describing various parameters related to data acquisition may be generated alongside the raw data. This information may include a configuration of the liquid chromatograph 104 or mass spectrometer 112 (or other chromatography apparatus that acquires the data), which may define a data type. An identifier (e.g., a key) for a codec that is configured to decode the data may also be stored as part of the metadata and/or with the raw data. The metadata may be stored in a metadata catalog 130 in a document store 128.

The analysis device 126 may operate according to a workflow, providing visualizations of data to an analyst at each of the workflow steps and allowing the analyst to generate output data by performing processing specific to the workflow step. The workflow may be generated and retrieved via a client browser 132. As the analysis device 126 performs the steps of the workflow, it may read raw data from a stream of data located in the raw data store 124. As the analysis device 126 performs the steps of the workflow, it may generate processed data that is stored in a metadata catalog 130 in a document store 128; alternatively or in addition, the processed data may be stored in a different location specified by a user of the analysis device 126. It may also generate audit records that may be stored in an audit log 134.

Figure 7:
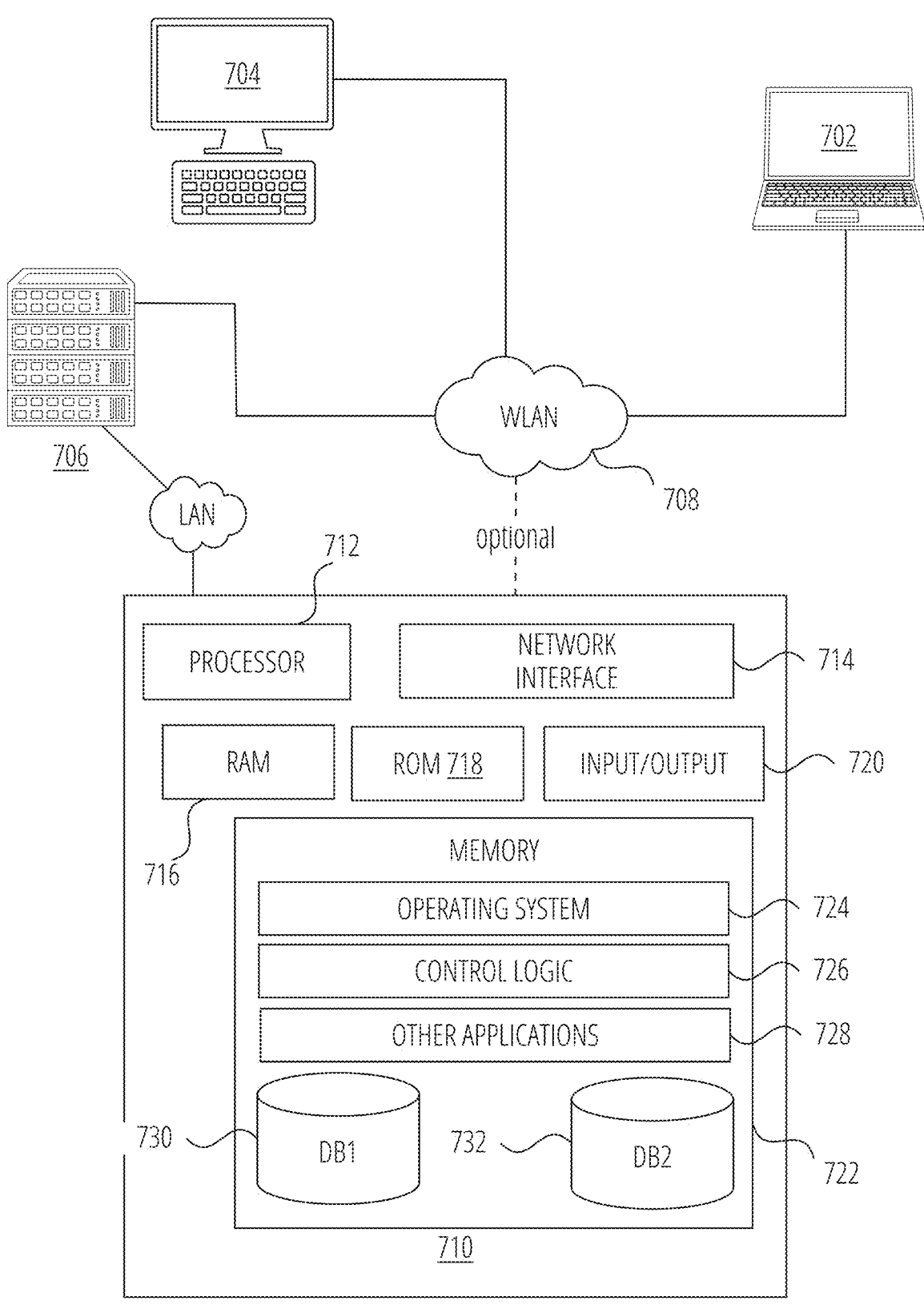
FIG. 7 depicts an illustrative computer system architecture that may be used to practice exemplary embodiments described herein.

The exemplary embodiments described herein may be performed at the client browser 132 and analysis device 126, among other locations. An example of a device suitable for use as an analysis device 126 and/or client browser 132, as well as various data storage devices, is depicted in FIG. 7.

Figure 2:
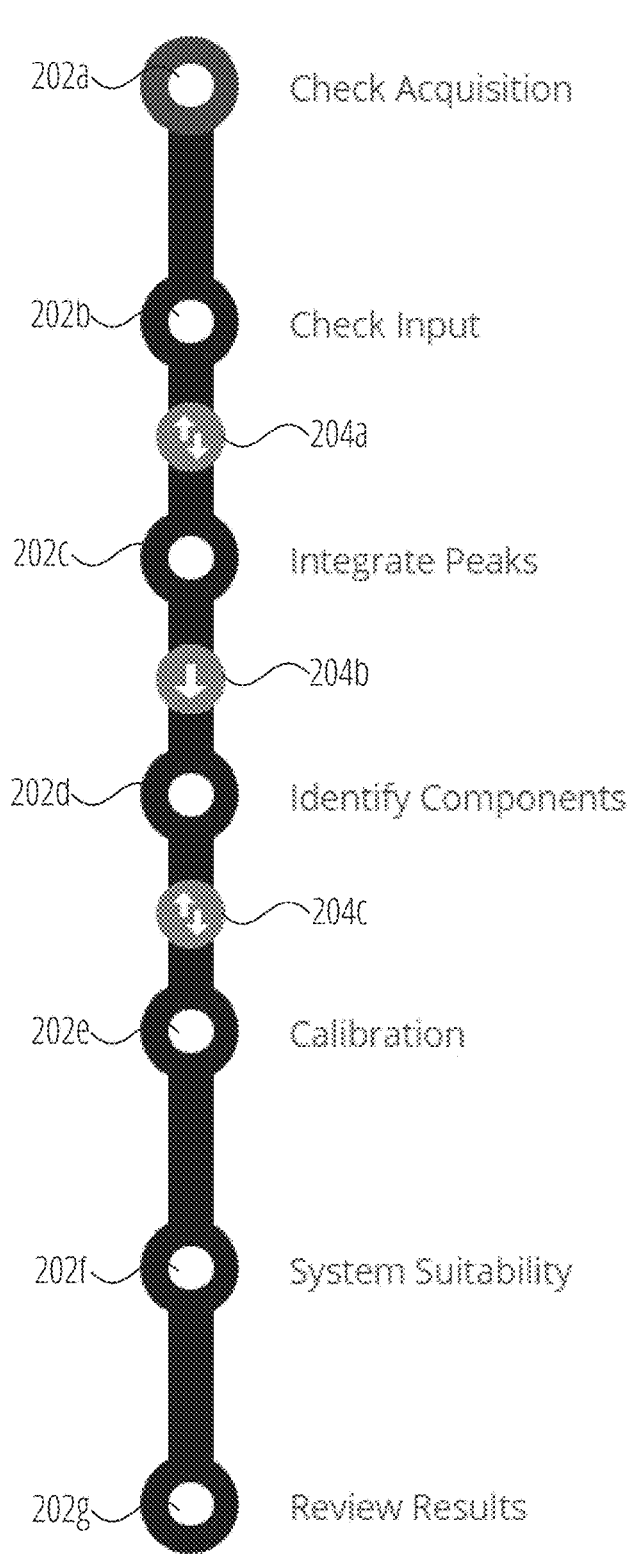
FIG. 2 depicts an exemplary interface for a workflow builder, including workflow steps, transitions, and visualizations associated with each step, according to an exemplary embodiment.
Figure 2:
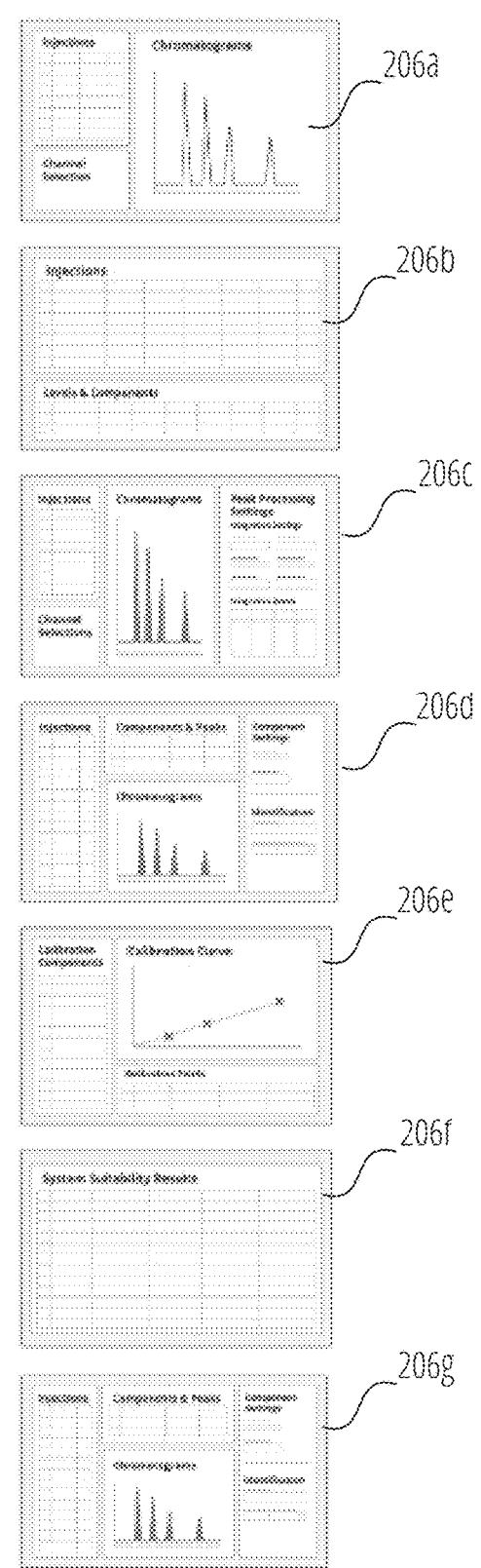

An analytical method may be embodied in a workflow, which describes how data is generated and analyzed in a series of steps or stages. FIG. 2 depicts an example of a way that a workflow may be displayed in a user interface of a workflow builder (e.g., as might be displayed on the client browser 132 previously described).

In the user interface, a set of steps 202a-202g are arranged in an order. The user may be provided with a set of steps that can be arranged on the interface, or may select from a number of pregenerated templates. The user may be permitted to move the steps in the order, although the workflow builder may enforce a relative ordering of certain steps (e.g., requiring that the integrate peaks step 202c be performed before the calibration step 202e).

Some or all of the steps may be separated by transitions 204a-204c. The transitions may be associated with a direction (e.g., allowing movement in the forward direction in the order, a reverse direction, or a forward direction and a reverse direction). The application implementing the workflow may enforce the transitions by only allowing movement in the workflow as indicated by the transitions. At each of the transitions, the application may enforce a change in data stewardship; responsibility for the data may be changed from a group of users associated with the steps before the transition to a group of users associated with the steps after the transition. The application may require that the group of users relinquishing and/or acquiring data access rights provide a signature.

Each of the steps 202a-202g may be associated with one or more pages defining different configurations for the steps (e.g., configurations and arrangements of visualization elements, settings for the step and/or visualization elements, etc.). The workflow builder may receive, via a user interface, a selection of one of the steps 202a-202g and, in response, may display images of the pages available for use with the selected step. The images may show different configurations and arrangements of the visualization elements for the step. Upon receiving a selection of an image associated with one of the pages, the system may associate that page with the selected step. The page may define instructions as to how to arrange and configure the visualization elements/step. The application implementing the workflow may retrieve the page definitions and apply them to configure the visualization elements/steps being implemented by the application. FIG. 2 provides examples of pages 206a-206g that have been selected for, and associated with, each of the steps 202a-202g.

Figure 3:
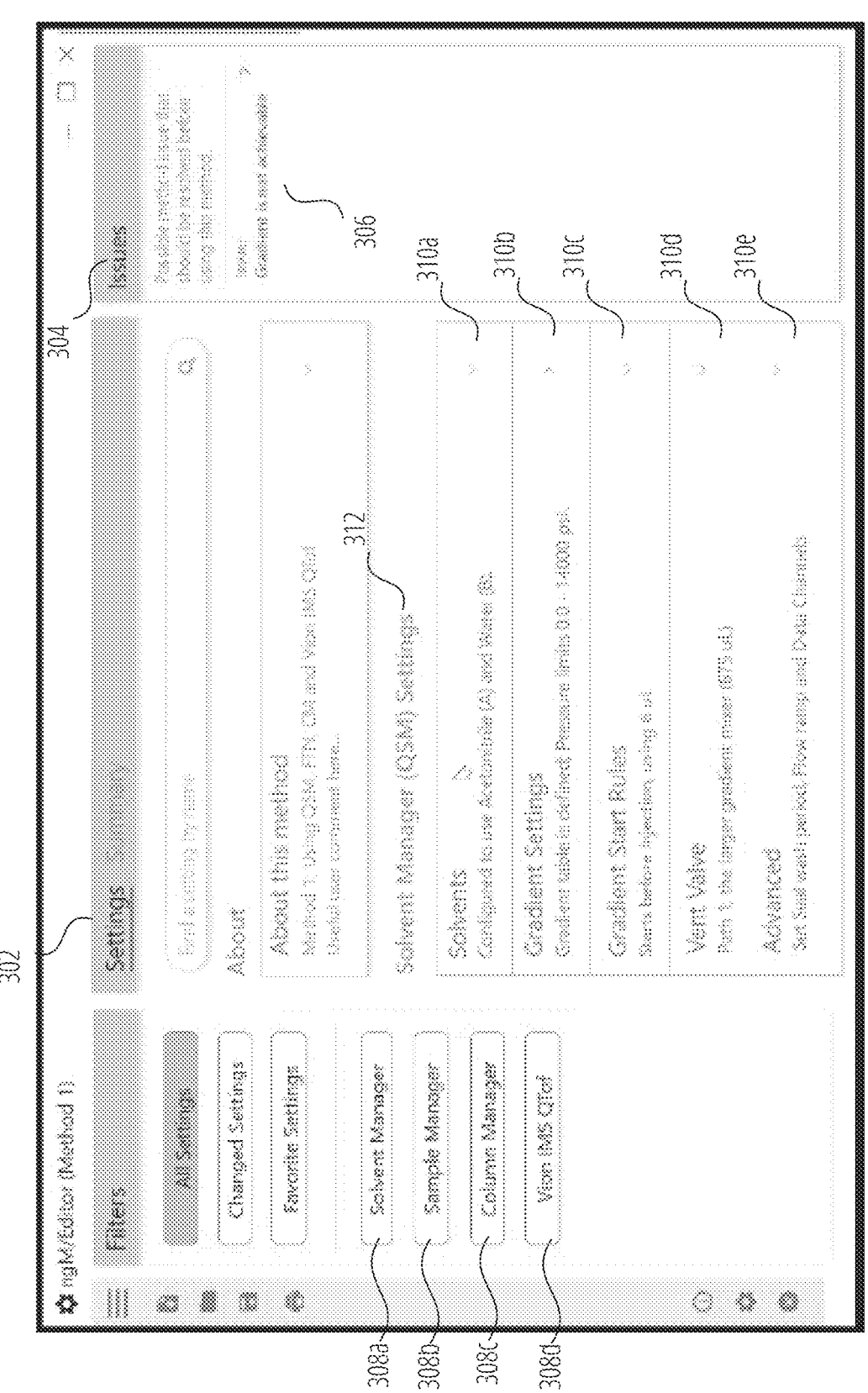
FIG. 3 depicts an example of a debugger interface in accordance with one embodiment.

An analytical method may include settings, configurations, and parameter values (collectively simplified herein to parameters) pertaining to one or more devices in an analytical laboratory system (such as the one depicted in FIG. 1). These values may control a laboratory analytical instrument, an analysis device, etc. The method may be represented in a computer memory as a data structure (see, e.g., FIG. 5) and may be shown in an interface so that the method can be created, edited, imported, etc. An example of such an interface is shown in FIG. 3.

The exemplary interface is divided into a number of panels, including a settings interface 302 and an issues interface 304. The settings interface 302 shows how the device or devices used in the method are configured with the parameters. The issues interface 304 shows any currently-outstanding errors or warnings associated with the method.

The parameters may be organized into categories 308a, 308b, . . . based on which aspects of the method the parameters control or relate to. For example, some parameters (308a) may pertain to the solvent that is used in the analytical laboratory instrument and how the solvent moves through the instrument's column. Other parameters (308b) describe various aspects of the sample being tested, such as the expected components/peak values for the sample, how the sample is injected into the instrument, how the samples are organized on plates, etc. Yet other parameters (308c)

relate to the column used in the laboratory instrument, and may define values such as the column temperature, flow rate, etc. Still other parameters (308d) might define instrument-specific settings for the particular type of laboratory analytical instrument being used (in the depicted example, an ion mobility quadrupole time of flight mass spectrometer, although one of ordinary skill in the art will recognize that many different types of laboratory analytical instruments can be accommodated). The depicted categories 308a, . . . are exemplary only, and one of ordinary skill in the art will recognize that more, fewer, and/or different categories may be used.

The categories 308a, . . . may be subdivided into subcategories 310a, 310b, . . . . Each subcategory 310a . . . may represent further organizational groupings for the parameters within the category 308a . . . . For instance, the solvent category 308a may be further subdivided into settings for identifiers for the specific solvent(s) used (310a), the gradient settings for the solvents (310b), the gradient start rules for the solvents (310c), the configuration of vent valves used with the solvent(s) (310d), and advanced settings (310e) such as the set seal wash period, flow ramp settings, and configuration for solvent-related data channels. One of ordinary skill in the art will recognize the different possible subcategories that may be used to organize each category.

The categories and their subcategories may be shown in a category interface 312. The interface may include selectable elements corresponding to each of the available categories. Upon selection of one of the elements, the subcategories corresponding to the selected category may be displayed in the category interface 312.

Within the issues interface 304, any issues that have been identified (e.g., based on a set of rules as shown in FIG. 5) may be presented. Issues may take the form of errors (which will prevent the method from running correctly) and warnings (which may not prevent the method from running, but which may have negative effects that are undesirable). For instance, the interface depicted in FIG. 3 shows one issue 306 in the form of an error—given the currently-defined configuration for the method, the desired gradient is not achievable.

Figure 4:
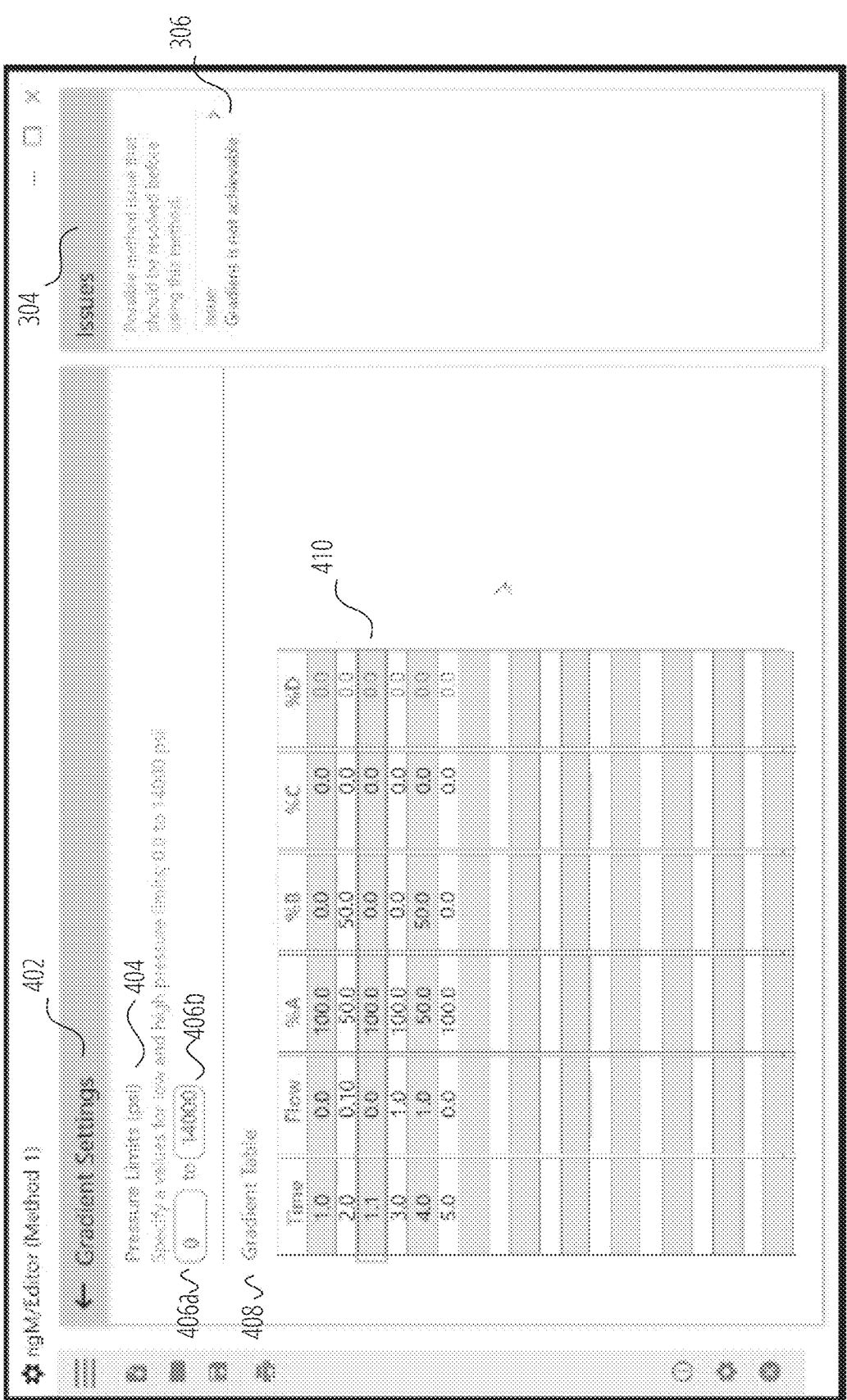
FIG. 4 depicts an example of another debugger interface in accordance with one embodiment.

Once an issue 306 is identified and displayed in the interface, the issue 306 may become interactable. Upon receiving a selection of a specific issue 306 in the issues interface 304, the category interface 312 may be updated to show the category that is linked to the issue (e.g., the category where the issue can be resolved), as shown in FIG. 4. To that end, each issue may be associated with a particular category or categories (e.g., in the rules database shown in FIG. 5). Selecting the issue 306 in the issues interface 304 may cause the system to determine which category is associated with the issue 306 and to navigate to the associated category (or subcategory, if available) in the interface. As used herein, navigating to a "category" may entail navigating to a particular subcategory within the category.

For example, in FIG. 4, the selected issue 306 relates to the gradient (i.e., that the gradient is unachievable given other parameter settings and/or the capabilities of the laboratory analytical instrument being used in the analytical laboratory system on which the method is being performed). The configuration of the desired gradient may be shown in a gradient table, which is a part of the gradient subcategory of the solvent category. Thus, when the issue 306 is selected, the interface may be updated to depict a category interface 402 for the solvent/gradient subcategory.

Within the gradient subcategory are settings for the system pressure, which may be depicted in a pressure parameter interface 404, and the above-noted gradient table, which may be depicted in a gradient interface 408. The pressure parameter interface 404 includes parameter values 406a, 406b for minimum/maximum pressure limits, respectively. The gradient interface 408 includes the gradient table, and the line on the gradient table that is not achievable (per the issue 306) may be highlighted as a flagged configuration 410. Although this particular example uses a flagged configuration 410 that is represented as a line in the gradient table, the flagged configuration 410 may represent any parameter or group of parameters that give rise to the issue that has been selected; the particular parameters that are flagged may be defined by the rule in the rules database.

The user may be able to resolve the issue directly from the category/subcategory that is navigated to as a result of selecting the issue in the issues interface 304. For example, in FIG. 4 the user could adjust the gradient table to change the intended gradients until they fall within acceptable tolerances, given other parameter settings for the laboratory analytical instrument. In some cases, it may not be possible (or desirable) to edit the flagged configuration 410—for instance, the user may wish to adjust other settings so that the issue is resolved. For example, in this case, changing the pressure settings or other solvent settings may render the gradient indicated by the flagged configuration 410 achievable. In some embodiments, the issue 306 shown in the issues interface 304 may provide suggestions for how to resolve the issue, which may include interactable links that navigate the interface to other categories/subcategories that can be used to address the issue. When the issue has been addressed, the corresponding interactable issue 306 may be removed from the issues interface 304.

Even if the interface is only navigated to the location of the issue, however, this still provides advantages over conventional techniques that require the user to identify for themselves the identity and location of issues in the method. In this case, the user is shown specifically where the problem exists (and the degree of the problem) and can choose for themselves what other settings they might wish to adjust to fix the issue. As the user adjusts other settings, the user can see if the adjustments address the issue because the issue 306 will disappear from the issues interface 304. While the issue 306 is unresolved, the user can always select the issue 306 in the issues interface 304 to navigate back to the issue (e.g., to see how changes in other parameters have affected the flagged configuration 410). Of course, if the user is also provided with suggestions as to the categories and subcategories that could be used to fix the issue, this further simplifies the work of the user and allows the issue to be resolved more quickly and efficiently.

In some cases, addressing the issue 306 may cause other issues to arise in other codependent parameters. These issues may be identified (before or after the issue is resolved) and presented in the issues interface 304. For example, if the issue 306 is resolved but this gives rise to a new issue, then the new issue may be displayed in the issues interface 304 after the issue 306 is removed. Alternatively or in addition, the issue 306 may also display a warning that one or more parameters are codependent on the parameter(s) that gave rise to the issue, and that adjusting the codependent parameters (e.g., to fall outside of a specified range) may cause a new issue to be raised.

FIG. 5 depicts data structures that may be used to identify issues and navigate to related categories/subcategories. The data structures may be resident on an analysis device 126 such as the one depicted in FIG. 1, and/or may be remote from the analysis device 126 and accessed through a connection such as a network connection.

The data structures may include a method representation 502 that stores details relating to the method parameters. For example, the method representation 502 may include data structures) representing method categories 504a, 504b, . . . . The method categories may include an identifier that provides a name of the category (not shown), as well as parameters/settings 506 for the category.

The data structures may also include a rules database 508. The rules database 508 may represent possible issues in terms of rules 510. Rules 510 may be logical constructs. For example, a rule may compare a condition, comparison, or instruction with an implication. For instance, if the pressure settings are outside of a prescribed range (the condition), then the pressure gradient is not achievable (the implication). The condition or comparison may be, for instance, a comparison of configuration values for a laboratory analytical instrument or other device in an analytical laboratory system to predefined thresholds, maximums, minimums, comparative values, etc.).

Rules 510 may be codependent. For example, one rule may refer to another rule in determining whether an issue arises (e.g., "Rule A can only be violated if Rule B is violated," or "If Rule C is violated, Rule D cannot be violated," etc.).

Similarly, in some cases one or more parameters/settings 506 of the method may be related to each other, such that adjusting one of the parameters causes a change to another parameter. If such a parameter is used by the rule 510 (and/or the solution(s) 516 to the rule 510), such parameters may be flagged as codependent. Optionally, related rules that use the codependent parameters may be identified in the rules database 508. When a codependent parameter is adjusted, the system may be configured to automatically check whether the change caused another rule to be violated for one of the related codependent parameters.

The rules database 508 may relate a rule 510 to a method category 512. The method category 512 may be automatically determined from the rule 510, such as when the implication of the rule 510 is specific to a particular method category 504a, . . . . The method category 512 might also be automatically identified for the rule 510 where the condition for the rule relates values in a particular category or subcategory. The method category 512 may also be specified as part of defining the rule 510. In some embodiments, multiple method categories 512 may be specified for a single rule 510, such as when the solution to a rule might be found in multiple different locations (or where the issue represented by the rule 510 can be resolved by making changes to different categories).

The rules database 508 may further specify an error/warning 514 for the rule 510. The error/warning 514 may include a flag indicating whether the rule is an error (e.g., such that the method will not operate while the rule is violated) or merely a warning (e.g., that the current configuration violates a best practice or includes an issue that will still allow the method to run, but sub-optimally). The error/warning 514 may also include explanatory text that explains the issue that arises when the rule is violated. The explanatory text may be displayed in connection with the issue 306 in the issues interface 304.

The rules database 508 may optionally include solution(s) 516 that may address the issue raised when the rule 510 is violated. The solution(s) 516 may include an indicator of one or more categories/subcategories in which the solution can be implemented, and/or explanatory text describing how parameters in the category/subcategory can be adjusted to address the issue. Optionally, the explanatory text may be displayed alongside the issue 306 in the issues interface 304. The explanatory text may include links to the categories/subcategories defined by the solution(s) 516 so that the user can quickly navigate in the interface to the specific location where the solution can be implemented.

The rules database 508 may be user-extensible and/or user editable. For example, an interface or wizard may be presented allowing a user to add a new rule 510 to the rules database. The interface may allow a user to enter a rule (e.g., a comparison of a configuration on a laboratory analytical instrument performing the method to a minimum or maximum threshold, a relative value, etc.). The interface may also allow the user to enter a method category 512 related to the rule 510, the error/warning 514 that should be displayed when the rule is violated, associated rules that may depend on the rule 510, and suggested solution(s) 516 to be displayed so that the issue can be addressed.

Although a particular organizational structure for the rules 510 is shown in FIG. 5 (a rules database 508), one of ordinary skill in the art will recognize that other organizational structures are also possible. Moreover, the issue need not be represented in terms of rules, specifically, but could be captured as any suitable representation (e.g., as part of a model-based representation).

Figure 6:
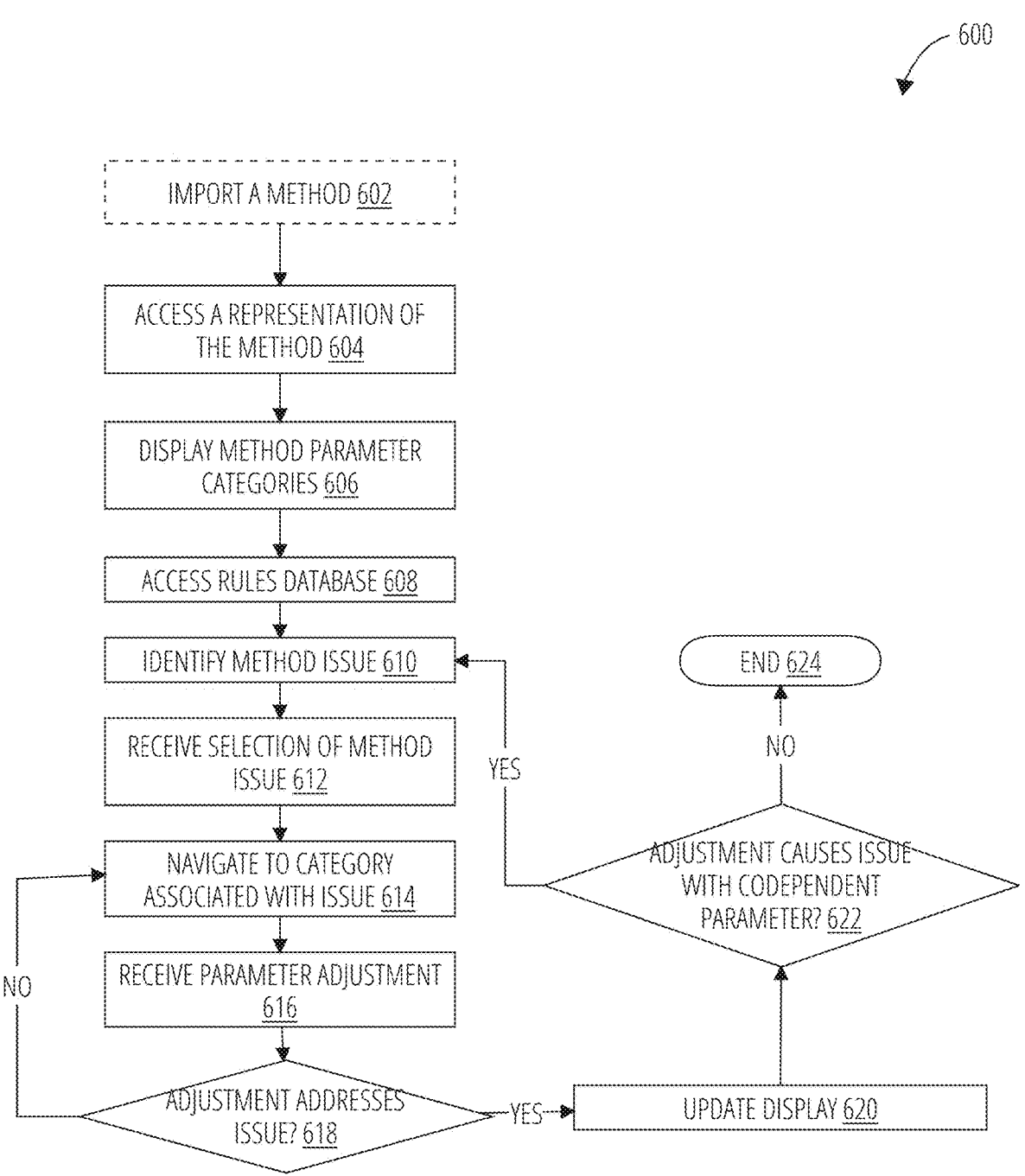
FIG. 6 illustrates exemplary debugging logic in accordance with one embodiment.

FIG. 6 is a flowchart depicting exemplary debugging logic for performing a computer-implemented method according to an exemplary embodiment. The logic may be embodied as instructions stored on a computer-readable medium configured to be executed by a processor. The logic may be implemented by a suitable computing system configured to perform the actions described below.

In block 602, a method may optionally be imported. The method may be analytical method for use in a analytical laboratory system. The method may be represented as one or more data structures that provide parameter values to configure the laboratory analytical instrument(s) and/or other devices of the analytical laboratory system. The method may have been previously set up or configured for use on a first (previous) analytical laboratory system, and may be imported for use with a second (current) analytical laboratory system. In this way, methods that were used with legacy analytical laboratory systems can be reused with new systems, or methods may be ported from one system to another. Although importing a method may save time by avoiding the need to recreate the method from scratch, there may be incompatibilities or inconsistencies between the first and second systems that give rise to issues. These issues may mean that the method will not operate on the second system, or that the method will not operate as intended, optimally, etc. The exemplary embodiments described herein allow these issues to be quickly identified and addressed in an efficient and interactive manner.

In block 604, a representation of the method may be accessed. The method may be stored as a data structure accessible to an analytical laboratory system (see, e.g., FIG. 5). The analytical laboratory system may access the data structure and identify the categories/subcategories of the method, and/or the parameter settings within each category/subcategory.

In block 606, method parameter categories (and/or subcategories) may be displayed in a debugger interface (see, e.g., FIG. 3). The method parameter categories may be derived from the categories and subcategories of the representation defining the method (as retrieved in block 604).

In block 608, a rules database may be accessed. The rules database may be a representation, such as the one depicted in FIG. 5, for storing rules that identify issues in analytical methods. The rules database may or may not be specific to a particular method. The rules database may include one or more rules that identify when an issue occurs, explanatory text for the issue, a method category that relates to the issue, possible solutions for the issue, codependent rules related to another rule, codependent parameters, etc.

In block 610, an issue with the method may be identified. The issue may be identified by consulting one or more of the rules in the rules database and comparing the conditions in the rules to the real-world values for the analytical laboratory system. For example, each of the rules in the rules list may be checked in sequence. If two or more rules are codependent, they may be evaluated in an order prescribed by the dependency. For instance, if Rule B depends from Rule A (e.g., Rule B can only be violated if Rule A is violated), then Rule A may be evaluated before Rule B; if Rule A is not violated, then Rule B need not be evaluated.

In some embodiments, the laboratory analytical system may include a configuration file or other data structure that records the capabilities and configurations of the devices in the system. These values may be compared to the rules to determine if any of the rules are violated. The method may be edited live, so that the configuration file or data structure is updated in real-time as the system configuration changes. When the file/data structure is changed, an event may be triggered that causes the debugger to check the changed setting against the rules.

In some embodiments, some method parameters may be flagged for priority comparison. For example, if a method is being imported from a previous system and there are known incompatibilities between the old system and the new system, then at block 602 the parameters known to be incompatible may be flagged for evaluation. Those parameters may be checked against the rules first. Similarly, known-good parameters may be flagged so that they need not be checked.

Any issues that are identified may be presented in a user interface, such as the one depicted in FIG. 3. The issue shown in the interface may include an issue name, an identifier indicating if the issue is an error or a warning, and descriptive text that describes the issue and/or possible solutions to the issue. This information may be drawn from the rules database. In block 612, a user may select one of the issues, and the selection may be registered by the debugger.

In block 614, the interface may be updated to navigate to a category or subcategory associated with issue (again, based on the information in the rules database). The category/subcategory may be a location of the issue in the method and/or a location where a parameter exists whose adjustment may address the issue. The specific location of the issue (e.g., a particular parameter value, row or column in a table, etc.) may be highlighted or otherwise visually distinguished.

In block 616, an adjustment to a parameter may be received. For example, the user may adjust one of the parameters highlighted in block 614, or may make an adjustment to a different user-determined parameter.

In decision block 618, the debugger may determine whether the adjustment addresses the issue. For example, the adjusted settings may be compared to the rule that originally triggered the issue. If the adjusted settings correct the problem, then in block 620 the display may be updated to remove the issue from the issues interface. If the adjusted settings do not correct the problem, then the issue may remain in the issues interface.

If the issue is resolved by the change in the parameter value, it may be necessary to determine if the change caused new issues to arise. For example, in decision block 622 the system may determine whether the adjusted parameter is associated with a codependent parameter, and/or whether the rule that gave rise to the issue that has just been corrected had any codependent rules. If so, the codependent rules may be evaluated and/or the codependent parameters may be compared to the rules in the rules database to determine whether any new issues are raised. If a new issue is raised, then processing may revert to block 610 and the new issue may be presented in the issue interface. Once all issues have been resolved, then processing may revert to block 624 and terminate.

Although FIG. 6 depicts particular actions performed in a specific order, embodiments are not limited to the configuration shown in FIG. 6. It is contemplated that more, fewer, or different logical blocks may be implemented. Similarly, it is contemplated that the actions may be performed in a different order than the one shown in FIG. 6.

FIG. 7 illustrates one example of a system architecture and data processing device that may be used to implement one or more illustrative aspects described herein in a stand-alone and/or networked environment. Various network nodes, such as the data server 710, web server 706, computer 704, and laptop 702 may be interconnected via a wide area network 708 (WAN), such as the internet. Other networks may also or alternatively be used, including private intranets, corporate networks, LANs, metropolitan area networks (MANs) wireless networks, personal networks (PANs), and the like. Network 708 is for illustration purposes and may be replaced with fewer or additional computer networks. A local area network (LAN) may have one or more of any known LAN topology and may use one or more of a variety of different protocols, such as ethernet. Devices data server 710, web server 706, computer 704, laptop 702 and other devices (not shown) may be connected to one or more of the networks via twisted pair wires, coaxial cable, fiber optics, radio waves or other communication media. The computer 704 may be any suitable type of computer, such as a desktop computer, mobile device (such as a smartphone or tablet), etc. The computer 704 may implement some or all of the logic described above. In particular, the computer 704 on which the debugging is done may (or not be) portable or mobile.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 710, web server 706, and client computer 704, laptop 702. Data server 710 provides overall access, control and administration of databases and control software for performing one or more illustrative aspects described herein. Data server 710 may be connected to web server 706 through which users interact with and obtain data as requested. Alternatively, data server 710 may act as a web server itself and be directly connected to the internet. Data server 710 may be connected to web server 706 through the network 708 (e.g., the internet), via direct or indirect connection, or via some other network. Users may interact with the data server 710 using remote computer 704, laptop 702, e.g., using a web browser to connect to the data server 710 via one or more externally exposed web sites hosted by web server 706. Client computer 704, laptop 702 may be used in concert with data server 710 to access data stored therein, or may be used for other purposes. For example, from client computer 704, a user may access web server 706 using an internet browser, as is known in the art, or by executing a software application that communicates with web server 706 and/or data server 710 over a computer network (such as the internet).

Servers and applications may be combined on the same physical machines, and retain separate virtual or logical addresses, or may reside on separate physical machines. FIG. 7 illustrates just one example of a network architecture that may be used, and those of skill in the art will appreciate that the specific network architecture and data processing devices used may vary, and are secondary to the functionality that they provide, as further described herein. For example, services provided by web server 706 and data server 710 may be combined on a single server.

Each component data server 710, web server 706, computer 704, laptop 702 may be any type of known computer, server, or data processing device. Data server 710, e.g., may include a processor 712 controlling overall operation of the data server 710. Data server 710 may further include RAM 716, ROM 718, network interface 714, input/output interfaces 720 (e.g., keyboard, mouse, display, printer, etc.), and memory 722. Input/output interfaces 720 may include a variety of interface units and drives for reading, writing, displaying, and/or printing data or files. Memory 722 may further store operating system software 724 for controlling overall operation of the data server 710, control logic 726 for instructing data server 710 to perform aspects described herein, and other application software 728 providing secondary, support, and/or other functionality which may or may not be used in conjunction with aspects described herein. The control logic may also be referred to herein as the data server software control logic 726. Functionality of the data server software may refer to operations or decisions made automatically based on rules coded into the control logic, made manually by a user providing input into the system, and/or a combination of automatic processing based on user input (e.g., queries, data updates, etc.).

Memory 1222 may also store data used in performance of one or more aspects described herein, including a first database 730 and a second database 732. In some embodiments, the first database may include the second database (e.g., as a separate table, report, etc.). That is, the information can be stored in a single database, or separated into different logical, virtual, or physical databases, depending on system design. Web server 706, computer 704, laptop 702 may have similar or different architecture as described with respect to data server 710. Those of skill in the art will appreciate that the functionality of data server 710 (or web server 706, computer 704, laptop 702) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
   accessing a representation of an analytical method for performing an analysis in an analytical laboratory system, the analytical laboratory system comprising a laboratory analytical instrument and the analytical method comprising a plurality of parameters for the laboratory analytical instrument, the parameters divided into categories, wherein the analytical method is performed by the analytical laboratory system;
   displaying, in an interface, a list of the categories;
   accessing, with the analytical laboratory system, a list of system capabilities;
   displaying an issue associated with the analytical method, the issue associated with a particular category of the method and being identified using the list of system capabilities;
   receiving a selection of the issue; and
   navigating, in the list of the categories, to the particular category associated with the selected issue.

2. The computer-implemented method of claim 1, wherein the analytical laboratory system is a current analytical laboratory system, and further comprising:
   importing the analytical method from a previous analytical laboratory system; and
   identifying the issue based on an incompatibility between the previous analytical laboratory system and the current analytical laboratory system.

3. The computer-implemented method of claim 1, further comprising:
   receiving an update to a parameter in the particular category, wherein the update addresses the issue; and
   updating the interface to indicate that the issue is resolved.

4. The computer-implemented method of claim 1, wherein the issue is identified by:
   receiving a change to a first parameter from the plurality of parameters;
   identifying that a second parameter is codependent on the first parameter; and
   determining that the change to the first parameter caused the issue with the second parameter.

5. The computer-implemented method of claim 1, wherein the issue is identified by consulting a list of rules associated with the analytical laboratory system, and determining that a setting for at least one of the plurality of parameters violates a rule from the list.

6. The computer-implemented method of claim 5, wherein the rules comprise a first rule and a second rule that is interdependent on the first rule, and the setting for the at least one of the plurality of parameters violates the second rule.

7. A non-transitory computer-readable storage medium, the computer-readable storage medium including instructions that when executed by a computer, cause the computer to:

access a representation of an analytical method for performing an analysis in an analytical laboratory system, the analytical laboratory system comprising a laboratory analytical instrument and the analytical method comprising a plurality of parameters for the laboratory analytical instrument, the parameters divided into categories, wherein the analytical method is performed by the analytical laboratory system;

display, in an interface, a list of the categories;

access, with the analytical laboratory system, a list of system capabilities;

display an issue associated with the analytical method, the issue associated with a particular category of the method and being identified using the list of system capabilities;

receive a selection of the issue; and navigate, in the list of the categories, to the particular category associated with the selected issue.

8. The computer-readable storage medium of claim 7, wherein the analytical laboratory system is a current analytical laboratory system, and wherein the instructions further configure the computer to:

import the analytical method from a previous analytical laboratory system; and identify the issue based on an incompatibility between the previous analytical laboratory system and the current analytical laboratory system.

9. The computer-readable storage medium of claim 7, wherein the instructions further configure the computer to:

receive an update to a parameter in the particular category, wherein the update addresses the issue; and update the interface to indicate that the issue is resolved.

10. The computer-readable storage medium of claim 7, wherein the issue is identified by:

receive a change to a first parameter from the plurality of parameters;

identify that a second parameter is codependent on the first parameter; and determine that the change to the first parameter caused the issue with the second parameter.

11. The computer-readable storage medium of claim 7, wherein the issue is identified by consulting a list of rules associated with the analytical laboratory system, and determine that a setting for at least one of the plurality of parameters violates a rule from the list.

12. The computer-readable storage medium of claim 11, wherein the rules comprise a first rule and a second rule that is interdependent on the first rule, and the setting for the at least one of the plurality of parameters violates the second rule.

13. A computing apparatus comprising:

a processor; and a memory storing instructions that, when executed by the processor, configure the apparatus to:

access a representation of an analytical method for performing an analysis in an analytical laboratory system, the analytical laboratory system comprising a laboratory analytical instrument and the analytical method comprising a plurality of parameters for the laboratory analytical instrument, the parameters divided into categories, wherein the analytical method is performed by the analytical laboratory system;

display, in an interface, a list of the categories;

access, with the analytical laboratory system, a list of system capabilities;

display an issue associated with the analytical method, the issue associated with a particular category of the method and being identified using the list of system capabilities;

receive a selection of the issue; and navigate, in the list of the categories, to the particular category associated with the selected issue.

14. The computing apparatus of claim 13, wherein the analytical laboratory system is a current analytical laboratory system, and wherein the instructions further configure the apparatus to:

import the analytical method from a previous analytical laboratory system; and identify the issue based on an incompatibility between the previous analytical laboratory system and the current analytical laboratory system.

15. The computing apparatus of claim 13, wherein the instructions further configure the apparatus to:

receive an update to a parameter in the particular category, wherein the update addresses the issue; and update the interface to indicate that the issue is resolved.

16. The computing apparatus of claim 13, wherein the issue is identified by:

receive a change to a first parameter from the plurality of parameters;

identify that a second parameter is codependent on the first parameter; and determine that the change to the first parameter caused the issue with the second parameter.

17. The computing apparatus of claim 13, wherein the issue is identified by consulting a list of rules associated with the analytical laboratory system, and determine that a setting for at least one of the plurality of parameters violates a rule from the list.

* * * * *